May 1, 1962 I. JEPSON 3,031,735
PROCESS OF MANUFACTURING ELECTRICALLY HEATED COOKING VESSEL
Filed Nov. 19, 1956 4 Sheets-Sheet 1
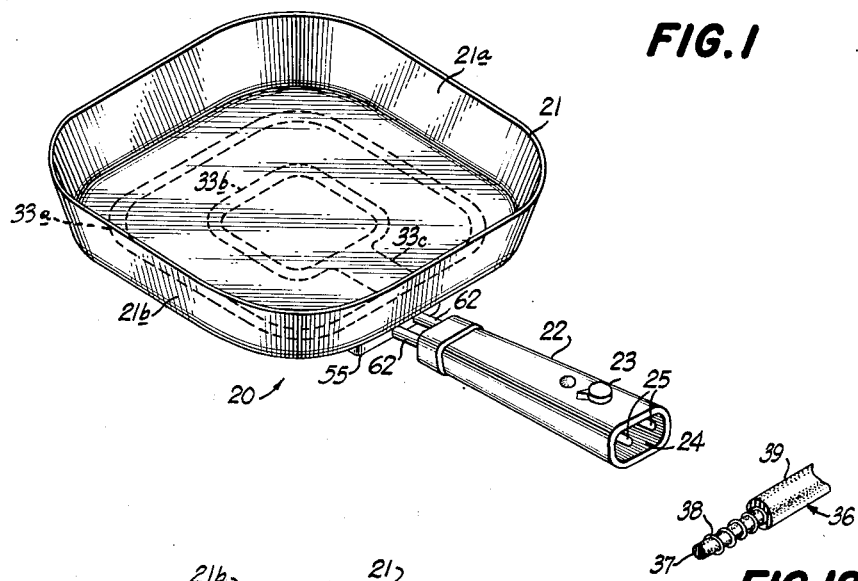
FIG. 1
FIG. 12
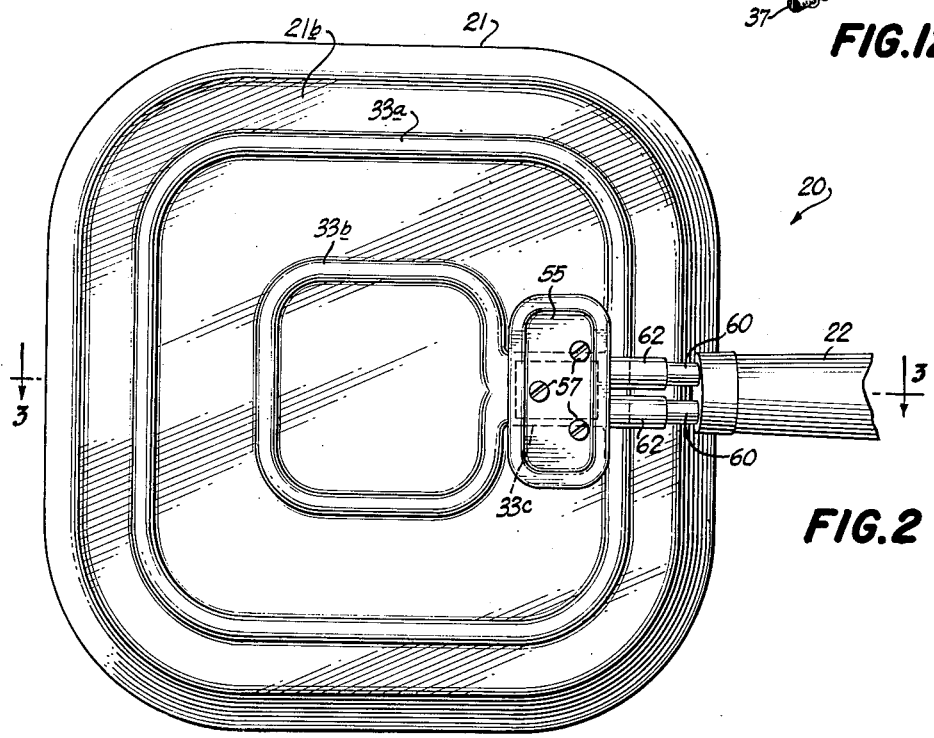
FIG. 2
INVENTOR
IVAR JEPSON
BY
Mason, Kolehmainen, Rathburn and Wyss
ATTORNEYS May 1, 1962　　　　　I. JEPSON　　　　　3,031,735
PROCESS OF MANUFACTURING ELECTRICALLY HEATED COOKING VESSEL
Filed Nov. 19, 1956　　　　　　　　　　　　　　4 Sheets-Sheet 2

INVENTOR
IVAR JEPSON
BY Mason, Kolehmainen, Rathburn and Wyss
ATTORNEYS

May 1, 1962

I. JEPSON 3,031,735

PROCESS OF MANUFACTURING ELECTRICALLY HEATED COOKING VESSEL

Filed Nov. 19, 1956

INVENTOR.
IVAR JEPSON
BY
*Mason, Kolehmainen, Rathburn and Wyss.*
ATTORNEYS

United States Patent Office 3,031,735
Patented May 1, 1962

3,031,735
PROCESS OF MANUFACTURING ELECTRICALLY HEATED COOKING VESSEL
Ivar Jepson, Oak Park, Ill., assignor to Sunbeam Corporation, Chicago, Ill., a corporation of Illinois
Filed Nov. 19, 1956, Ser. No. 622,949
7 Claims. (Cl. 29—155.5)

The present invention relates to a process of manufacturing electrically heated cooking vessels and specifically to an improved process of manufacturing general purpose cooking vessels having built-in electric heating elements and controls therefor.

During the past several years there has been extensive development of completely self-contained cooking vessels which are provided with means for accurately controlling the temperature thereof. Representative of this type of cooking vessel is that disclosed in Jepson Patent No. 2,744,995, granted May 8, 1956, and assigned to the same assignee as the instant application. The cooking vessel disclosed in the above-mentioned Jepson patent has gone into extensive commercial use and in excess of one million such self-contained cooking vessels were sold by the assignee of the above-mentioned Jepson patent during the first year that the device was on the market. Today there are available on the market frying pans, saucepans, deep-fat fryers, automatic coffee makers, egg cookers and the like, all of which are essentially self-contained cooking vessels having built-in electric heating units and automatic controls for accurately maintaining temperature or providing some other predetermined control condition.

The success of the automatically controlled self-contained electrically heated cooking vessels has been due primarily to the fact that they are either completely or substantially completely immersible in liquid for cleaning purposes without any adverse effect thereto. The problem of manufacturing such cooking vessels so that they can be immersed for cleaning purposes has not been a simple one to solve and manufacturers have made the vessels in various ways. They have been manufactured as castings from light metal such as aluminum, and the vessels have also been drawn from sheet metal with the necessary welding and soldering of joints to insure immersibility of the completed vessel. It would be desirable to provide an improved method of manufacturing such self-contained cooking vessels which is inexpensive and yet which results in a foolproof vessel which can be immersed for cleaning purposes and which will still insure very satisfactory and uniform heating and automatic control thereof.

It will be appreciated that in cooking vessels the desirable characteristics of the interior of the vessel may be different from those desired for the exterior. It is sometimes desirable, for example, for the exterior of the vessel to be made of a relatively hard material which is scratchproof and, hence, will maintain a pleasing appearance over long periods of time. The interior of the vessel, on the other hand, should be corrosion-resistant so as not to be affected by the materials cooked therein and, of course, should be a very excellent heat conductor to insure uniform heating throughout with resultant satisfactory cooking of any material contained therein. To provide a pleasing exterior appearance and particularly a hard scratchproof surface, manufacturers of cooking vessels have gone to materials such as stainless steel, which has the desirable scratchproof characteristic but unfortunately is not a good heat conductor and does not provide the desired uniform temperature when employing a heating element in heat transfer relationship therewith. Aluminum, on the other hand, is a very excellent heat conductor and the majority of the cooking vessels have been manufactured from aluminum for this reason. However, relatively pure aluminum which has the desirable characteristics with respect to corrosion resistance when subjected to certain foods does not have the desirable hardness to be relatively scratchproof. There are, of course, available on the market aluminum alloys which are relatively hard and scratchproof. It would be desirable to provide a method of making a cooking vessel which would permit having a relatively scratchproof material on the exterior and a good heat conducting and corrosion-proof material on the interior. It would furthermore be desirable to make the vessel from rolled sheet material rather than as a die casting, since the thermal characteristics of the former are superior to the latter. The rolled sheet material may be pure aluminum, which is much denser than any cast aluminum alloy. Moreover, such sheet material will be free from pin holes and blow holes encountered in a casting.

Accordingly, it is an object of the present invention to provide an improved method of manufacturing electric heating vessels or cooking vessels which may be completely immersible in liquids for cleaning purposes.

It is a further object of the present invention to provide an improved process of manufacturing an electrically heated cooking vessel in which a drawn sheet metal vessel is formed having an elongated heating element inserted into a cavity formed integrally with the vessel.

It is another object of the present invention to provide an improved process of manufacturing an electrically heated cooking vessel in which the interior and exterior thereof may be formed of materials of the same or different characteristics from the standpoint of scratch resistance and corrosion resistance and which materials have a high heat conductivity characteristic.

Still another object of the present invention resides in the provision of an improved process of manufacturing a cooking vessel which is simple and inexpensive and results in a greatly improved product.

It is a further object of the present invention to provide an improved method of manufacturing an electric cooking vessel of the type having self-contained automatic temperature control means which involves an improved electrical heating element.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 1 is a perspective view of a representative cooking vessel manufactured in accordance with the process of the present invention;

FIG. 2 is an enlarged bottom view of the vessel portion of the completed cooking vesesl of FIG. 1;

FIG. 6 is an exploded perspective view, somewhat distorted, illustrating one step in the manufacture of the cooking vessel of the present invention;

FIG. 7 is an enlarged sectional view taken substantially along the line 7—7 of FIG. 6 after the parts of FIG. 6 have been integrally joined;

FIG. 8 is a view partly in section similar to FIG. 6 illustrating another step in the process of manufacturing in present invention;

FIG. 9 is a perspective view illustrating still another step in the process of manufacturing the cooking vessel of the present invention;

FIG. 10 is a perspective view similar to FIGS. 7, 8 and 9 illustrating still another step in the process of manufacturing the cooking vessel of the present invention;

Figure 3:
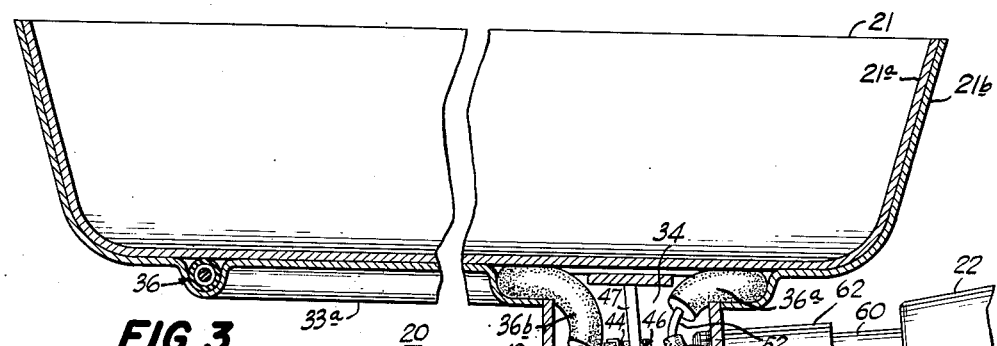
FIG. 3 is an enlarged sectional view taken substantially on line 3—3 of FIG. 2.

Briefly, the present invention is concerned with a process of manufacturing a cooking vessel in which two sheets of material, one defining the interior of the cooking vessel and the other the exterior, are bonded together with the exception of certain portions which are to define internal passageways for the heating element and the like. After the bonding operation is completed the unbonded portions are expanded to define a tubular cavity or passageway into which is inserted an improved heating element. During a vessel forming operation the passageway defined therein for the heating element is deformed so as to cause the latter to be disposed in intimate heat exchange relationship with the vessel and specifically the cooking surface thereof. In this manner there may be produced a cooking vessel having identical interior and exterior surfaces or quite different interior and exterior surfaces, as the case may be, which is completely sealed against moisture.

It should be understood that the present invention is applicable to manufacturing heating units or cooking vessels of all kinds wherever it is desirable to use an electric heating element and a control means for either maintaining a constant temperature or providing a certain desired temperature control. In order to illustrate the present invention, however, it has been shown as specifically applied to the manufacture of an electric frying pan of somewhat the nature disclosed in the above-mentioned Pepson patent. It should be appreciated that this is by way of example only and the particular vessel and the particular type of control may vary widely from that shown. It is believed that the temperature sensing element should preferably be of the liquid filled remote bulb type such as is disclosed in a copending Jepson and Hill application, Serial No. 501,652, filed April 15, 1955, and also assigned to the same assignee as the present application rather than the particular control arrangement shown. Obviously, however, as far as the method of the present invention is concerned, the particular temperature control mechanism is immaterial.

Referring now to the drawings, there is illustrated in FIGS. 1 to 4 thereof an electrically heated cooking vessel of the type having accurate self-contained temperature control means, which cooking vessel is generally designated by the reference numeral 20. The cooking vessel 20 is specifically illustrated as a frying pan comprising a container or vesesl portion 21 which is illustrated as of substantially rectangular configuration thereby permitting one to cook more food in the same area as contrasted with the circular frying pan heretofore commonly employed. To make cleaning a simple problem, the four corners of the vessel are smoothly rounded. As will become apparent from the ensuing description, the container portion 21 is formed of two aluminum sheets, which may have the same or different characteristics, as the case may be, integrally bonded together thus insuring that the vesesl is formed of a very good heat conductor with the further assurance that uniform temperature throughout the surface of the vesesl, and particularly the cooking surface, can readily be attained. Associated with the container portion 21 of the cooking vessel 20 is a suitable handle 22 which contains certain control portions including a control knob 23 which is manually adjustable to select the desired cooking temperature. As illustrated, the end of the handle 22 remote from the vessel is provided with a cord receptacle recess 24 into which extend pin type electrical terminals 25 for engagement with a suitable power cord in a manner well understood by those skilled in the art.

Preferably, although not shown in the drawings, the cooking vessel 20 will be provided with suitable legs such as those disclosed in the above-mentioned Jepson patent or Jepson and Hill application.

In accordance with the present invention, and as best shown in FIG. 3 of the drawings, the container portion 21 of the cooking vessel 20 is formed of two sheets of metal, preferably aluminum, comprising an inner sheet 21a and an outer sheet 21b which are metallurgically bonded together so that, to all intents and purposes, only a single sheet is involved, there being homogeneity across the interface. Actually, FIG. 3 is not an accurate representation of the completed article, since it indicates two separate sheets instead of a homogeneous piece of material which results. However, FIG. 3 has been shown in the manner indicated in order more clearly to illustrate the present invention.

Figure 11:
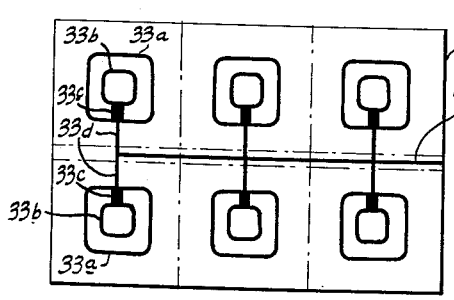
FIG. 11 is a somewhat schematic view illustrating one step in the manufacturing process where a plurality of the units are simultaneously manufactured as far as certain steps of the process are concerned.

Referring now to the process of manufacturing the cooking vessel of the present invention and considering first FIG. 6 of the drawings, it is observed that two separate sheets of material designated as 21a and 21b are desired to be metallurgically bonded together so as to provide the material for the vessel or container portion 21 of cooking vessel 20. Actually, in FIGS. 6, 8 and 9 of the drawings the indication is that two sheets of material, sufficient to make only one cooking vessel, are employed. Practically, and as best shown in FIG. 11 of the drawings, the sheets of material to be bonded together are much larger than that necessary to make a single vessel and, as illustrated in FIG. 11, the sheets are large enough to make six or more vessels simultaneously, at least insofar as certain steps of the process are concerned. However, from the standpoint of illustrating the invention, it is simpler to consider only the portion thereof which goes to make a single vessel, and in these FIGS. 6, 8 and 9 only a small portion of FIG. 11 is illustrated. In accordance with one embodiment of the present invention the sheets 21a and 21b are each formed of essentially the same basic material, but there are instances where it may be desirable to employ sheets each having different characterisics. As illustrated, the sheet 21a which will form the interior of the cooking vessel is preferably slightly thicker than the sheet 21b which will eventually form the exterior of the vessel or container 21. The sheet 21a may comprise a corrosion-resistant sheet of aluminum having the surface thereof, eventually defining the cooking surface, anodized to give improved protection against pitting and corrosion. In an embodiment built in accordance with the present invention, the sheet 21a which defines the interior of the vessel was one-sixteenth of an inch in thickness in the final condition in the completed vessel and was formed of a corrosion-resistant aluminum of the type which has been commercially designated as 2S. The sheet 21b in the final condition in the completed vessel in an embodiment built in accordance with the present invention was formed of a commercial aluminum sheet designated as 61S, which essentially is a hard and relatively scratch-proof material, and had a thickness of only three sixty-fourths of an inch. It will be appreciated that attractive colors may be applied to the surfaces of sheets 21a or 21b, or both, which will eventually be exposed in the cooking vessel 20. This can be accomplished by suitable dyes capable of withstanding high temperatures and, also, the acid conditions encountered by the food or other material to be in contact with the inside of the cooking vessel.

Referring now to FIG. 6, which effectively comprises a section of FIG. 11 of the drawings, and assuming that in an actual manufacturing operation a plurality of sections of FIG. 6 will be united together as in FIG. 11, the sheets 21a and 21b are first degreased in any suitable manner as, for example, by immersion in an organic solvent bath. The sheets are also suitably treated to remove any oxide film, it being desirable to have the adjacent faces of the sheets 21a and 21b to be joined together to be completely clean and free of oxide so as to insure good bonding in a subsequent hot rolling operation. The sheets must also be dry.

For the purpose of defining within the completed vessel suitable passageways to house the electric heating element of the cooking vessel, there is applied to one of the sheets 21a or 21b a suitable weld-preventing material which may consist of a mixture of graphite in any suitable liquid such as waterglass or the like. This graphite material is then applied to one of the sheets in a suitable pattern as designated at 28 in FIG. 6 of the drawings. Actually, the pattern 28 shown in FIG. 6 of the drawings is distorted from what it would comprise to produce the arrangement of FIGS. 8, 9 and 10. This is because the sheets 21a and 21b are elongated about six times in the direction of rolling during the rolling step so that the actual pattern 28 would be much shorter in the direction of rolling than shown in FIG. 6. The distorted illustration of FIG. 6 is employed, however, to enable the reader more easily to see the relationship between FIG. 6 and FIGS. 8, 9 and 10 of the drawings. The pattern will, of course, be such as to insure uniform heating of the vessel when a heating element is ultimately disposed in the same pattern and the illustrated pattern is by way of example only. It will be understood that any configuration of pattern may be employed and the limited configurations of the prior art are no factor here. The pattern 28 is actually a thin layer of graphite plus a suitable carrier and may be applied in any manner such as by spraying through a masking die, painting through a stencil, squeezing through a silk screen or in any other suitable way. Preferably, the weld-preventing material is applied through a silk screen to the selected area or pattern 28 as shown in FIG. 6 of the drawings. A somewhat more viscous mixture of carbonaceous material may be employed under these conditions than if it is applied by painting or spraying.

After the pattern 28 of weld-preventing material has been applied to one of the sheets, specifically the sheet 21a in FIG. 6 of the drawings, the two sheets are superimposed with the weld-preventing material interposed, and of course the thickness of the weld-preventing material should be such as to prevent bonding of the metal except where such bonding is desired. It will be apparent that when the two sheets 21a and 21b are superimposed no relative movement between these sheets should occur or the pattern 28 thereon is likely to be damaged or distorted. To this end, the sheets 21a and 21b are preferably fastened together in any suitable manner as by tack welding or crimping the edges thereby preventing any relative movement until the two sheets are metallurgically bonded together.

In accordance with the present invention the assembly of the sheets 21a and 21b with the interposed pattern 28 of weld-preventing material are placed in a suitable furnace heated to around 1000° F. To prevent oxidation of the interfaces of the sheets 21a and 21b, the edges may be completely sealed as by welding or the like, or an inert or reducing atmosphere may be employed in the furnace if desired. The temperature of the furnace is several hundred degrees below the melting point of the sheet material 21a and 21b, but is sufficiently high to effect pressure welding of the two sheets of metal in the hot rolling step to be described hereinafter. The exact temperature to be used for the necessary welding is, of course, dependent upon the melting point of the particular metal or alloy used, but preferably it should be relatively close to the melting point of such metal or alloy.

The thickness of the interposed layer of weld-preventing material represented by the pattern 28 is preferably of the order of two to five-thousandths of an inch in thickness. As soon as the assembly of sheets 21a and 21b has reached the desired furnace temperature of about 925° to 950° F., this assembly is hot rolled in one pass through suitable rollers so as to reduce the thickness somewhat and to insure intimate bonding of the sheets except where the pattern 28 is located. As a matter of fact, a microscopic analysis of the metal after the hot rolling reveals that grain growth has taken place across the interfaces and one integral piece of metal is then the result. Preferably, after the hot rolling, the sheets may be cold rolled to a desired finished gauge, after which they are annealed at a temperature of about 650° F. to remove the hardening effect of the cold rolling. The cold rolling is desirable to accurately control the thinness of the sheet. If sufficient accuracy can be obtained by the hot rolling step, the cold rolling operation may be eliminated and, consequently, also the annealing step. It will be appreciated that a much stronger sheet of material is obtained by the construction described thus far than a cast construction, since a much more uniform grain structure is obtained in the arrangement of the present invention than in the cast construction.

In order to obtain the necessary channels or passageways for housing in sealed relationship the electric heating element for the cooking vessel 20 of the present invention, the sheets 21a and 21b, which have now been bonded together to form a single homogeneous sheet, must have the unwelded portion, in the form of pattern 28, expanded. To accomplish this an angular cut is made through the welded sheet comprising portions 21a and 21b, as shown by the line A—A in FIG. 7 of the drawings. By cutting the sheets at this angle it is readily possible to see a thin black line denoting the graphite layer, whereupon a suitable tool may be inserted where the graphite layer exists to pry open mechanically a sort of entry way to the pattern of weld-preventing material, whereby a suitable nozzle designated by the reference numeral 30 in FIG. 8 of the drawings may be inserted.

The next step in the process is illustrated by FIG. 8 of the drawings in which the sheets 21a and 21b which have been bonded together to form a single unitary sheet are placed within a suitable die comprising die halves 31 and 32, die 32 being illustrated as partially cutaway. These dies are employed to insure that the passageways for the heating elements to be described in detail hereinafter are defined on only one side of the material and the other side remains completely flat so as to define a satisfactory cooking surface. Preferably water is used as the fluid injected into the inflating tube or nozzle 30 and this may be introduced at a suitably high pressure while disposed within the die 31 and 32 with the result that raised ribs containing passageways are produced on only one side of the sheet, namely, the outside. These are defined at the places where the weld-preventing material in the pattern 28 was applied. As best shown in FIG. 8 of the drawings, these passageway defining ribs are designated as 33a, 33b, 33c and 33d. Actually, the portion of the passageway defining rib 33d has no utility after the expansion operation has been performed and it may be rolled down so that the arrangement takes the form shown in FIG. 9 of the drawings. Also, the passageway 33c, as best shown in FIG. 9 of the drawings, is a substantially enlarged area the top of which is cut away to afford access to a chamber 34 which interconnects the two somewhat circular passageways defined by the rib portions 33a and 33b.

The next step in the process of the present invention is the removal of the graphite or carbonaceous material which was provided to prevent welding. This may be accomplished by means of steam or the like so that there results a unitary sheet as shown in FIG. 9 of the drawings, designated by the reference numeral 35, which has the desired passageway defining ribs 33.

Figure 12:
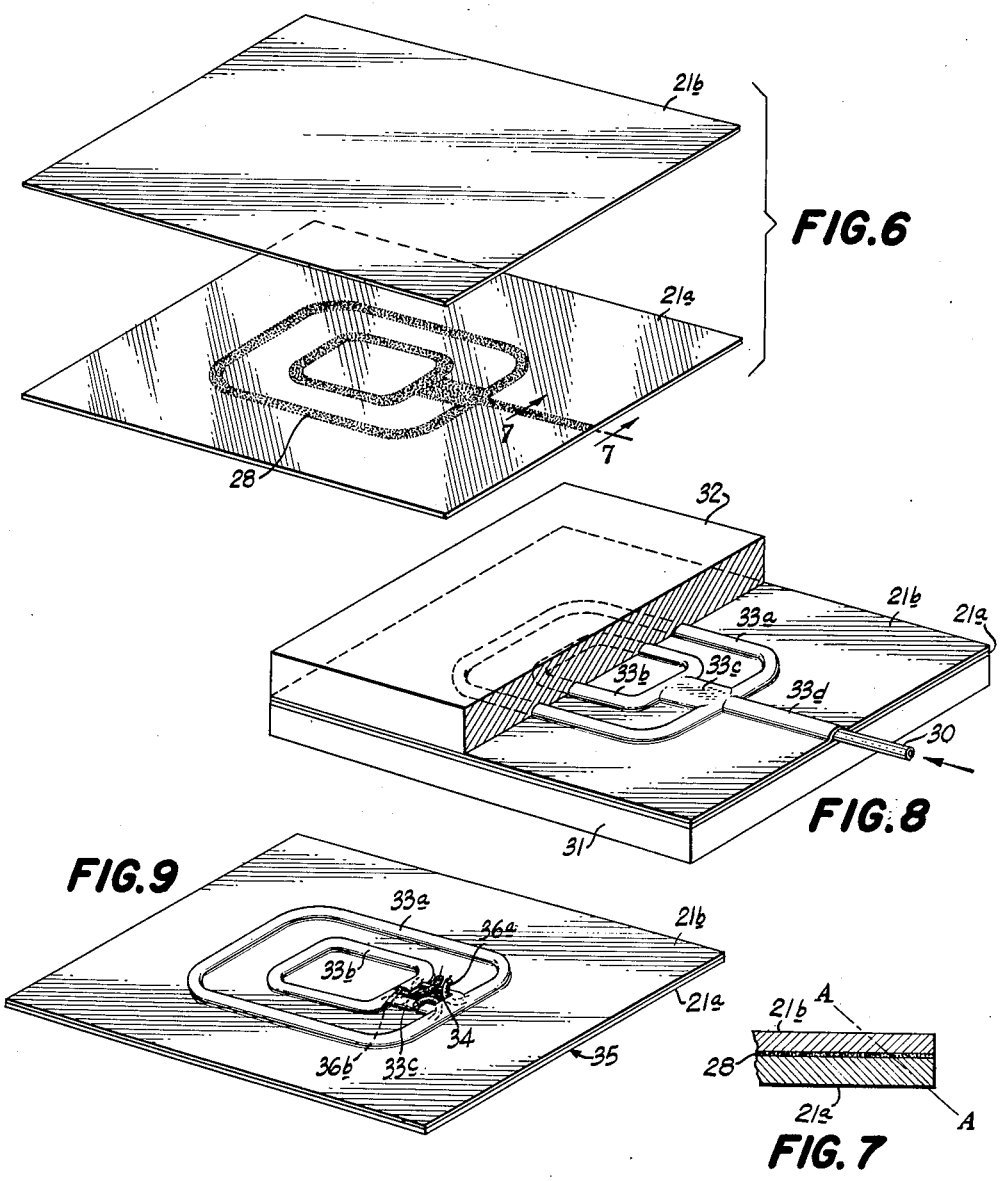
FIG. 12 is a fragmentary perspective view of an improved electric heating element employed to heat the cooking vessel manufactured in accordance with the present invention.

In accordance with the present invention, an improved heating element is employed for disposal in the passageways defined by the ribs 33a and 33b. This element is best shown in FIG. 12 of the drawings. As there illustrated, this heating element, generally designated by the reference numeral 36, is preferably formed of a core 37 of glass fibre around which the heating resistor 38 is spirally wound. The glass fibres are capable of withstanding high temperatures encountered in such electrically heated cooking vessels. To insulate the exterior of the heating resistor 38, there is provided a coating of additional glass fibre material designated as 39 which results in a very flexible heating element which will withstand the high temperatures involved. This coating may be glass threads wound on the exterior of the resistor 38. At the same time, this heating element is very inexpensive. Preferably, and as best shown in FIG. 9 of the drawings, the heating element 36 is threaded through the passageways defined by the ribs 33a and 33b, either as a continuous length threaded through both passageways in series with the terminals thereof disposed in the chamber 34, or in two separate sections as shown in FIG. 9 designated by the reference numerals 36a and 36b, respectively, whose terminals are also disposed in the chamber 34 whereby they may be connected in series and also into a suitable heating circuit.

The sheet 35 with the passageways defined therein containing the heating element 36 is now ready for drawing into the shape of the desired cooking vessel. FIG. 10 illustrates the resultant product designated as the vessel 21 after the drawing operation. It should be understood that the vessel or container might be drawn before the heating elements 36a and 36b are threaded into the passageways defined by the ribs 33a and 33b. Preferably, however, the heating elements are threaded into position while the sheet 35 is in a flat form of FIG. 9, whereupon the drawing operation may be both a drawing and a swaging operation for drawing the vessel and simultaneously swaging the passageway defining ribs 33a and 33b so as tightly to embrace the heating element 36, whereby the latter is in good heat conducting relationship with the bottom of the vessel. After the drawing and swaging operation, it will be apparent that there is provided a unitary vessel 21 effectively formed from a single sheet of material which may have the same or different materials on the inside and outside, and which contains a completely sealed channel therein for the electric heating elements with the terminals thereof extending into an access chamber 34 also formed in the same manner as the passageways defined in the ribs 33a and 33b.

Figure 4:
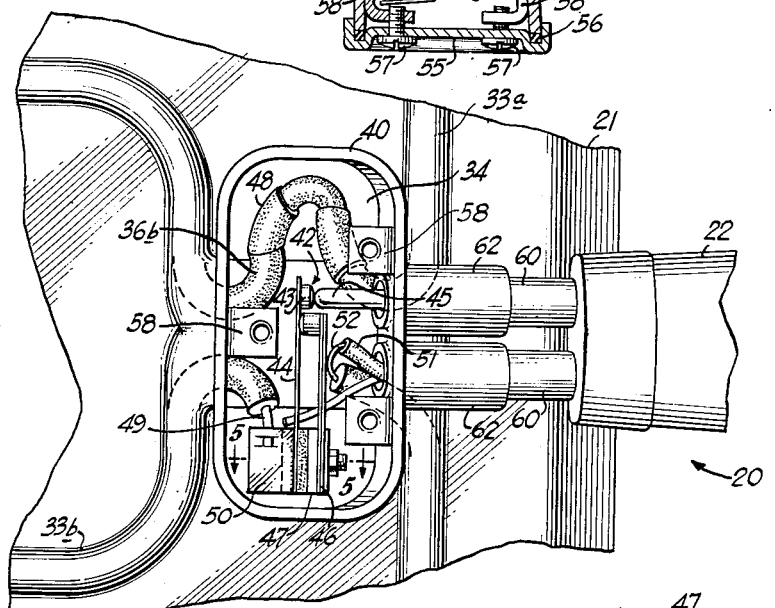
FIG. 4 is an enlarged fragmentary view of a portion of FIG. 2 with certain portions cut away.
Figure 5:
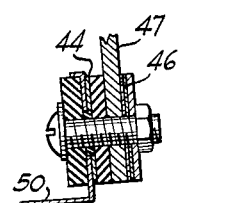
FIG. 5 is an enlarged sectional view taken on line 5—5 of FIG. 4, assuming that FIG. 4 shows the complete structure.

The control chamber 34 is obviously not large enough to accommodate the controls of the above-mentioned Jepson patent. To provide a sufficiently large control chamber, there preferably is welded into position, as best shown in FIGS. 3 and 4 of the drawings, a suitable housing 40 which may securely be sealed as by any suitable welding process to the edges of the opening defining the chamber 34. This housing 40 thus effectively defines a much larger chamber 34 than originally existed and provides ample space for suitable temperature sensing elements or the like. As a matter of fact, the temperature sensing elements in FIGS. 3 and 4 of the drawings are illustrated as being substantially identical with those disclosed in the above-mentioned Jepson patent and no further discussion thereof is included herewith except to point out that there is provided a switch 42 defined between a contact 43 suitably supported on a spring leaf 44 and the end of a longitudinally movable rod 45 extending into the handle 22 exactly in the manner of the above-mentioned Jepson patent. A suitable bimetal 46 has one end thereof secured to a bracket 47, which bracket is formed of good heat conducting material and is in intimate heat exchange relationship as by welding or the like with the bottom of the vessel 21 within the chamber 34. A suitable insulating sleeve 48 is illustrated as insulating the series connection between conductor sections 36a and 36b which is also disposed in chamber 34. The other terminal designated at 49 of the heating element section 36b is connected to an L-shaped conductor 50 electrically connected with the flexible leaf spring 44 and consequently the movable contact 43 of the switch 42. The terminal 52 of the other end of the heating element section 36a is connected by suitable conductor 51 extending up into the handle 22 to one of the pin type terminals 25.

For the purpose of providing a completely sealed enclosure as far as the chamber 34 is concerned, there is provided a suitable cover 55 for the housing 40 which preferably includes a recess for a suitable gasket 56. Suitable fastening means 57 extending through the cover 55 are illustrated as engaging suitable support members 58 welded or otherwise secured to the housing 40.

Preferably the handle 22 is secured to the vessel or container portion 21 in the same manner as in the above-mentioned Jepson patent. As illustrated, a pair of stainless steel tubes 60 are secured in sealed relationship with the handle 22 as by having the handle 22 molded thereto. The other ends of the stainless steel tubes 60 are inserted as by a suitable press fit into suitable metal bosses 62 which are secured in sealed relationship to the housing 40. In this manner there is provided a completely sealed arrangement with passageways for various control means such as electric conductors, and the movable rod 45 and at the same time the handle 22 are mechanically secured to the vessel 21.

The particular method of securing the handle to the vessel and the particular type of control means forms no part of the present invention and is illustrated merely by way of showing a complete device. What is at present believed to be the preferred construction of the temperature sensing elements for a cooking vessel made by the process of the present invention is of the type disclosed in the aforementioned copending Jepson and Hill application, Serial No. 501,652. With this arrangement there would be defined in the bottom of the vessel by the process described above a tubular chamber raised in the same manner as the passageways defined in the ribs 33 described above to receive the bulb of the temperature sensing element. Consequently, the temperature responsive means, the control switch, and all the other parts of the control could then be located in the handle of the vessel. This would permit one to cut away the top of rib 33c defining the chamber 34 to enable the electrical connections to be made and thereafter the chamber could be sealed by welding thereto a suitable cover since no further access to this chamber would be necessary. This would result in a completely sealed construction, since the bulb of the temperature sensing element would be provided in a manner similar to that in the above-mentioned Jepson and Hill copending application.

From the above description it will be apparent that there has been described an improved process of manufacturing a cooking vessel which results in a construction which has a much lower cost both from the standpoint of the completed vessel as well as from the standpoint of the electric heating element itself. It also results in a construction having better heat conductivity and, consequently, better heat distribution. It furthermore results in an arrangement in which the heating element may have any desired configuration with respect to the bottom of the vessel. The heating element may have a much more tortuous configuration than in prior art arrangements, thus insuring good heat distribution. Moreover, the watts per inch of heating element may be reduced, thus reducing chance of failure of the heating element. Also, the vessel may have the same interior and exterior, or the interior may be different from the exterior. Additionally, there is a possibility of a wide variety of color tones by anodizing and the resultant vessel will be very light compared with constructions necessary heretofore.

It will be appreciated from the above description that the manufacturing costs will be decreased substantially when a plurality of vessels are simultaneously manufactured at least up until the final drawing step. This is best shown in FIG. 11 of the drawings where the construction of FIGS. 6 and 8 is multiplied six times, the two sheets metallurgically bonded together being large enough to provide the material necessary for six vessels. The large bonded sheet is designated as 34' in FIG. 11 of the drawings. As there illustrated, the ribs 33a, 33b, 33c and 33d are present just as in FIG. 8. However, all of these ribs are connected by common rib 33e defining therein a passageway through which liquid may be introduced for the expansion operation. It will be understood that the silk screening operation, the heating operation, the hot rolling operation, the fluid expansion operation and the like are all performed to obtain the sheet 34' shown in FIG. 11 of the drawings.

Figure 13:
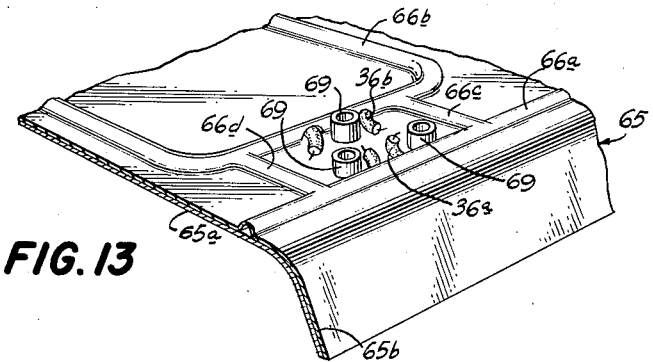
FIG. 13 is a fragmentary perspective view of a cooking vessel manufactured in accordance with the present invention at one stage during the process of manufacture thereof illustrating a modification of the present invention.
Figure 14:
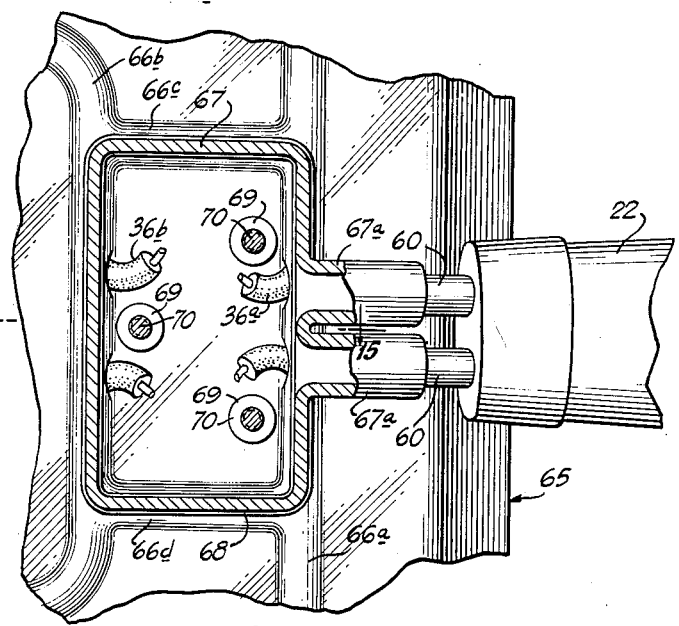
FIG. 14 is a fragmentary view, partly in section, similar to FIG. 4 of the drawings but with certain control elements omitted, illustrating the modification of FIG. 13 embodied in a cooking vesesl.
Figure 15:
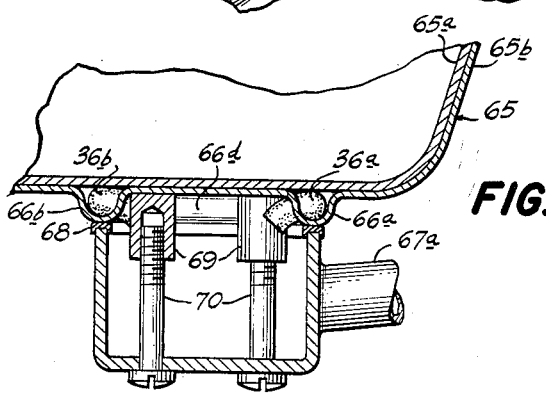
FIG. 15 is a fragmentary sectional view taken on line 15—15 of FIG. 14, assuming that FIG. 14 is complete except for the omitted control elements.

In FIGS. 13, 14 and 15 of the drawings there is illustrated a modification of the present invention insofar as certain details thereof are concerned and the corresponding parts of these figures are designated by the same reference numerals as in the above-described embodiment. In these figures there is illustrated the container portion of a suitable cooking vessel, generally designated at 65, with which is associated the handle 22 identical with the handle in the preceding embodiment and with which handle 22 are associated the stainless steel tubes 60. As in the preceding embodiment, the container portion 65 is formed of two sheets of metal comprising the inner sheet 65a and the outer sheet 65b. These sheets are bonded together in exactly the same manner as described above to form a unitary homogeneous vessel.

In accordance with the process described above, there are defined on the bottom exterior only of the container portion 65 passageway defining ribs 66a, 66b, 66c and 66d. The passageway defining rib 66a corresponds substantially identically with the passageway defining rib 33a of the preceding embodiment, and the passageway defining rib 66b corresponds to the passageway defining rib 33b of the preceding embodiment. The passageway defining ribs 66c and 66d effectively comprise short lengths interconnecting the passageway defining ribs 66a and 66b. Instead of cutting away any portions of the passageway defining ribs 66a, 66b, 66c and 66d, as in the preceding embodiment, these ribs are kept intact except for openings provided in the passageway defining ribs 66a and 66b between the passageway defining ribs 66c and 66d through which the sections 36a and 36b of the heating element 36 may be threaded. As illustrated in FIGS. 13 and 14, the ends of these heating element sections terminate in the space defined between the passageway defining ribs 66a, 66b, 66c and 66d.

In accordance with the modification illustrated in FIGS. 13, 14 and 15, there is provided a unitary somewhat cup-shaped die-cast housing 67 which is provided with a pair of integrally projecting bosses 67a which may be very similar to the bosses 62 described above. The housing 67, being a cup-shaped enclosure, is open only at the top, as viewed in FIG. 15 of the drawings, except for the openings provided in the bosses 67a. This housing has a configuration similar to the configuration of the interconnected portions of passageway defining ribs 66a, 66b, 66c and 66d. Since these ribs are formed in a suitable die, they can be accurately defined in a plane so that the housing 67 may be supported in sealed relationship with these ribs, as clearly shown in FIG. 15 of the drawings, by means of a suitable gasket 68.

For the purpose of securing the housing 67 into place, there preferably are welded or otherwise secured to the bottom of the container portion 65 within the area enclosed by the housing 67 suitable lugs 69 having tapped openings therein for receiving fastening means 70 extending through the bottom of the housing 67 with reference to the position indicated in FIG. 15 of the drawings. Suitable sealing means may be provided where the fastening means 70 pass through the housing 67. It will be apparent that the surface of the passageway defining ribs 66 engaged by the gasket 68 may have any suitable shape depending upon the particular die used during the operation of expanding the passageways defined in these ribs. For example, the gasket engaging portions of these ribs might be a flat surface or might actually define a shallow recess for receiving and retaining the gasket 68.

It will be understood that the tubular members 60 will be secured in sealed relationship with the bosses 67a in the manner disclosed in the above-mentioned Jepson patent. For simplifying the drawings, the temperature responsive means and the like have been completely eliminated in FIGS. 14 and 15.

In view of the detailed description included above, it will be apparent that there has been provided a greatly improved method of producing a cooking vessel which could be a saucepan, a frying pan, a coffee maker, an egg cooker or any similar device, and in such device the heating element is completely sealed as are also the controls so that the device can readily be immersed in liquid for washing purposes. Moreover, there is then obtained a cooking vessel in which the heat transfer is superior to that of vessels manufactured heretofore and in which the interior and exterior thereof may have different characteristics, if desired, commensurate with those most desirable for a satisfactory unit without in any way impairing the heat transfer characteristics. Additionally, by the arrangement described above, a homogeneous vessel is effectively provided which has completely sealed passageways defined therein for the heating element. The heating element is insulated by glass fibre insulation and can then be maintained in good heat transfer relationship with the bottom of the vessel to insure a very satisfactory device.

While there has been illustrated and described a particular embodiment of the present invention, it will be understood that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A method of manufacturing an electrically heated cooking vessel comprising, forming a flat integral metallic sheet with at least one continuous and partially curved passageway therein, expanding the cross-sectional area of said passageway, threading a flexible insulated electric heating element within the expanded area of the continuous passageway in said sheet, drawing said sheet into the shape of a vessel, and swaging the walls defining said continuous passageway into good heat conducting relationship with said flexible heating element.

2. A method of manufacturing an electrically heated cooking vessel comprising, forming a flat integral metallic sheet with at least one continuous passageway including curved portions therein, expanding the cross-sectional area of said continuous passageway, threading a flexible insulted electric heating element within the expanded continuous passageway in said sheet, and simultaneously drawing said sheet into the shape of a vessel and swaging said sheet into good heat conducting relationship with said heating element.

3. A method of manufacturing an electrically heated cooking vessel comprising arranging a weld-preventing material in a predetermined curved pattern between adjacent surfaces of a pair of superimposed metallic sheets, welding said sheets together by elevating their respective temperatures to a value less than but relatively close to their respective melting points to provide a composite welded sheet, inserting a fluid under high pressure into the space occupied by said weld-preventing material between said sheets to provide an expanded curved passageway of substantial cross-section in the composite welded sheet, threading a flexible electrically insulated heating element into said curved passageway, subjecting said composite welded sheet to a swaging operation wherein the walls of said expanded passageway are swaged into contact with said heating element, and drawing said composite welded sheet into the shape of a cooking vessel.

4. A method of manufacturing an electrically heated plate which comprises, forming a unitary sheet from two separate sheets of material with an elongated continuous and at least partially curved expanded passageway defined therebetween, threading a flexible insulated electric heating element within said passageway, and deforming the walls of said passageway to insure good heat transfer relationship between said insulated electric heating element and said unitary sheet.

5. A method of manufacturing an electrically heated cooking vessel comprising, disposing a weld-preventing material in a predetermined pattern on the surface of a first metallic sheet, placing a second metallic sheet over said first sheet so that said weld-preventing material is positioned between said sheets, one of said sheets being relatively corrosion-resistant and the other of said sheets being relatively hard and scratch-resistant, welding together the contacting surfaces of said metallic sheets to provide a unitary metallic sheet having at least one partially curved passageway therein and with said sheet having different characteristics on the respective sides thereof, expanding said hard, scratch-resistant portion of said sheet which is adjacent said passageway by inserting a fluid of high pressure in said passageway, threading a flexible insulated electric heating element within the expanded passageway, forming said unitary metallic sheet into a vessel with the corrosion-resistant side of said sheet forming the inside of said vessel and swaging said sheet into heat conducting relation with said electric heating element.

6. The method of manufacturing an electrically heated cooking vessel which comprises fluid expanding a continuous and at least partially curved passageway in a substantially uniplanar sheet of metal, drawing said sheet of metal into the shape of a cooking vessel, threading a flexible insulated heating element into said continuous curved passageway, and swaging said sheet of metal into a heat conducting relation with said heating element.

7. A method of manufacturing an electrically heated cooking vessel comprising, arranging a weld-preventing material in a predetermined curved pattern between adjacent surfaces of a pair of superimposed metallic sheets, bonding said pair of sheets together to provide a single composite sheet, inserting a fluid under high pressure into the space occupied by said weld-preventing material between said sheets to provide an expanded curved passageway of substantial cross-section in the composite sheet, threading a flexible electrically insulated heating element into said curved passageway, subjecting said composite sheet to a swaging operation wherein the walls of said expanded passageway are swaged into contact with said heating element, and drawing said composite sheet into the shape of a cooking vessel.

References Cited in the file of this patent

UNITED STATES PATENTS

| | | |
|---|---|---|
| 1,564,681 | Kercher | Dec. 8, 1925 |
| 2,358,104 | Scavullo | Sept. 12, 1944 |
| 2,375,334 | Valyi et al. | May 8, 1945 |
| 2,443,806 | Shafter | June 22, 1948 |
| 2,740,188 | Simmons | Apr. 3, 1956 |
| 2,744,995 | Jepson | May 8, 1956 |
| 2,766,514 | Adams | Oct. 16, 1956 |
| 2,777,300 | Palmer | Jan. 15, 1957 |
| 2,920,377 | Janos | Jan. 12, 1960 |
| 2,948,053 | Goff | Aug. 9, 1960 |